United States Patent
Voyles

(10) Patent No.: US 10,274,311 B2
(45) Date of Patent: Apr. 30, 2019

(54) THREE DIMENSIONAL LASER MEASUREMENT DEVICE FOR QUALITY CONTROL MEASUREMENTS

(71) Applicant: COLUMBIA INSURANCE COMPANY, Omaha, NE (US)

(72) Inventor: David Edward Voyles, Cleveland, TN (US)

(73) Assignee: COLUMBIA INSURANCE COMPANY, Omaha, NE (US)

(*) Notice: Subject to any disclaimer, the term of this patent is extended or adjusted under 35 U.S.C. 154(b) by 0 days.

(21) Appl. No.: 15/788,332

(22) Filed: Oct. 19, 2017

(65) Prior Publication Data
US 2018/0106604 A1 Apr. 19, 2018

Related U.S. Application Data

(60) Provisional application No. 62/410,146, filed on Oct. 19, 2016.

(51) Int. Cl.
*G01B 11/14* (2006.01)
*G01B 11/24* (2006.01)
*B23Q 17/20* (2006.01)

(52) U.S. Cl.
CPC .............. *G01B 11/24* (2013.01); *B23Q 17/20* (2013.01)

(58) Field of Classification Search
CPC ................................ B23Q 17/20; G01B 11/24
USPC ................................ 356/426–428, 23–26, 69
See application file for complete search history.

(56) References Cited

U.S. PATENT DOCUMENTS

| | | |
|---|---|---|
| 3,314,328 A | 4/1967 | Boettcher |
| 4,448,527 A | 5/1984 | Milana |
| 4,514,680 A | 4/1985 | Heikkila et al. |
| 4,676,130 A | 6/1987 | Nutt |
| 4,827,142 A | 5/1989 | Hatje |
| 4,906,098 A | 3/1990 | Thomas et al. |
| 4,934,229 A | 6/1990 | Greten et al. |

(Continued)

FOREIGN PATENT DOCUMENTS

| | | |
|---|---|---|
| EP | 1716997 B1 | 8/2009 |
| WO | WO-2015/155312 A1 | 10/2015 |

OTHER PUBLICATIONS

U.S. Appl. No. 62/410,146, filed Oct. 19, 2016, David E. Voyles.
Third Dimensions "GapGun Robot+ ", [Retrieved from: https://web.archive.org/web/20141008231031/http://www.third.com/us/products/gapgunrange/gap gunrobot] [Retrieved on May 17, 2016](6 pages).

(Continued)

*Primary Examiner* — Tri T Ton
(74) *Attorney, Agent, or Firm* — Ballard Spahr LLP

(57) ABSTRACT

Methods and systems for use of a three dimensional measurement laser are disclosed. An example method can comprise receiving, at a laser measuring device, an article (e.g., a flooring article) having a plurality of faces, the article being conveyed in a direction. At least a portion of a first face and a second face of the plurality of faces of the article can be irradiated with a laser of the laser measuring device to measure one or more profile dimensions associated with the first and second faces of the article. The measured profile dimensions associated with the first face and the profile dimensions associated with the second face are compared to predefined reference dimensions. In response to a difference between measured profile dimensions associated with the first face and the second face and the predefined reference dimensions exceeding a threshold value, the article can be determined to be defective.

20 Claims, 5 Drawing Sheets

(56) References Cited

U.S. PATENT DOCUMENTS

| | | | |
|---|---|---|---|
| 5,125,741 | A | 6/1992 | Okada et al. |
| 5,644,392 | A | 7/1997 | Soest et al. |
| 6,122,065 | A | 9/2000 | Gauthier |
| 6,272,437 | B1 | 8/2001 | Woods et al. |
| 6,486,955 | B1 * | 11/2002 | Nishi .................. G01B 11/002 356/401 |
| 6,594,590 | B2 | 7/2003 | Woods et al. |
| 6,757,058 | B1 | 6/2004 | Carman et al. |
| 6,858,826 | B2 | 2/2005 | Mueller et al. |
| 7,359,762 | B2 | 4/2008 | Etter et al. |
| 7,426,422 | B2 | 9/2008 | Carman et al. |
| 7,819,148 | B2 | 10/2010 | Rinfret et al. |
| 8,723,945 | B2 | 5/2014 | Lessard |
| 8,822,875 | B2 | 9/2014 | Webster et al. |
| 8,923,599 | B2 | 12/2014 | Astrom et al. |
| 2002/0000148 | A1 | 1/2002 | Brun |
| 2002/0025061 | A1 | 2/2002 | Metcalfe et al. |
| 2016/0103115 | A1 | 4/2016 | Hamby |
| 2016/0123020 | A1 | 5/2016 | Tarn |

OTHER PUBLICATIONS

LMI Technologies, "Gocator Profile Smart Sensor"[Retrieved from: https://web.archive.org/web/20140319144941/http://www.lmi3d.com/products/gocator/profilesensor][Retrieved on May 17, 2016 ](3 pages).

GreCon Company, "Inline Laser Thickness Measurement for Quality and Production Assurance" [Retrieved from: http://www.grecon.com/en/inlinelaserthicknessmeasurementforqualityandproductionassurance] [Retrieved on May 17, 2016] (2 pages).

Johnson Level & Tool Mfg. Co.,"Johnson Level 40/6616 Tile and Flooring Laser—Hardwood Flooring Project" [Retrieved from: http://www.johnsonlevel.com/Reviews/JohnsonLevelTileandFloori][Retrieved on May 17, 2016 ] (1 page).

Lap Laser, "Laser Sensors", [Retrieved from:https://www.lap-laser.com/metals-industries/measuringsystems/laser-sensors/][Retrieved on Jul. 23, 2018] (3 pages).

Creaform3d.com, "Portable Coordinate Measuring Machine (CMM) : HandyProbe" (2 pages).

* cited by examiner

THREE DIMENSIONAL LASER MEASUREMENT DEVICE FOR QUALITY CONTROL MEASUREMENTS

CROSS-REFERENCE TO RELATED APPLICATION

This application claims priority to and the benefit of the filing date of U.S. Provisional Patent Application No. 62/410,146, filed Oct. 19, 2016, which application is incorporated herein by reference in its entirety.

BACKGROUND

Conventionally, machined objects such as laminate and hardwood flooring can be formed having a profile that joins together by means of locking or slip fit. The profile has multiple critical dimensions that should be kept within a relatively small tolerance so that the pieces continue to fit together properly. Quality checks are completed before a production line enters full-speed production, known as "setting the profile." Currently, setting the profile is accomplished by first stopping all production in a line, removing a profiled plank from the production line, and placing the removed plank in an optical comparator for inspection.

If the removed plank passes optical inspection, the line can be restarted and full production can begin. However, if the plank fails inspection, a tooling adjustment is made and the process starts over again. Thus, the process of setting the profile can be time consuming, taking up to eight hours to complete. Moreover, because any pieces cut with an incorrect profile cannot be used as finished flooring product (e.g., because the pieces do not adhere to the tolerances required), any product tooled with an incorrect profile must be discarded.

Still further, because the moving parts of the machinery may drift during a production run, periodic quality checks must be completed during the production run. These periodic quality checks are completed in much the same way that the setting the profile is accomplished, but without stopping the line unless an issue is found. These and other shortcomings are addressed by the application.

SUMMARY

It is to be understood that both the following general description and the following detailed description are exemplary and explanatory only and are not restrictive. Provided are methods and systems for measuring a plurality of faces of an article (e.g., a flooring article) using a three dimensional laser measurement system.

In an aspect, an example method can comprise receiving, at a laser measuring device, an article (e.g., a flooring article) having a plurality of faces, the article being conveyed in a direction. At least a portion of a first face and a second face of the plurality of faces of the article can be irradiated with a laser of the laser measuring device to measure one or more profile dimensions (e.g., a distance between particular points along the surfaces of the article profile, or a location of a particular point along the surfaces of the article profile) associated with the first and second faces of the article. In an aspect, the first face can be disposed generally parallel with the direction of conveyance, and the second face can be disposed generally perpendicular with the direction of conveyance. The method can further comprise comparing the measured one or more profile dimensions associated with the first face and the one or more profile dimensions associated with the second face to predefined reference dimensions, and determining, in response to a difference between measured one or more profile dimensions associated with the first face and the one or more profile dimensions associated with the second face and the predefined reference dimensions exceeding a threshold value, that the article is defective.

In another aspect, a device can comprise a conveyor configured to convey an article (e.g., a flooring article) having a plurality of faces in a direction and a laser configured to irradiate at least a portion of a first face of the plurality of faces of the article disposed generally parallel with the direction of conveyance and at least a portion of a second face of the plurality of faces of the article disposed generally perpendicular with the direction of conveyance. A measuring device can be configured to measure one or more profile dimensions associated with the first face of the article and one or more profile dimensions associated with the second face of the article based on the laser irradiation, and a comparator can be configured to determine a difference between the measured one or more profile dimensions associated with the first face of the article and one or more profile dimensions associated with the second face of the article and a plurality of corresponding predefined reference dimensions. An alert system can be configured to determine that the article is defective in response to the difference exceeding a threshold value.

In yet another aspect, a device can comprise a conveyor configured to convey an article (e.g., a flooring article) having a plurality of faces in a direction, a plurality of cutting elements configured to perform a plurality of cutting operations on the plurality of faces of the article, and a laser configured to irradiate at least a portion of a first cut face of the plurality of faces of the article disposed generally parallel with the direction of conveyance and to irradiate at least a portion of a second cut face of the plurality of faces of the article disposed generally perpendicular with the direction of conveyance. The device can further comprise a measuring device configured to evaluate the sufficiency of one or more cuts of the first cut face and one or more cuts of the second cut face by measuring one or more profile dimensions of the first cut face and one or more profile dimensions of the second cut face based on the laser irradiation and a comparator configured to determine a difference between the measured one or more profile dimensions of the first cut face and one or more profile dimensions of the second cut face and a plurality of corresponding predefined reference dimensions. An alert system can be configured to determine that the article is defective in response to the difference exceeding a threshold value.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
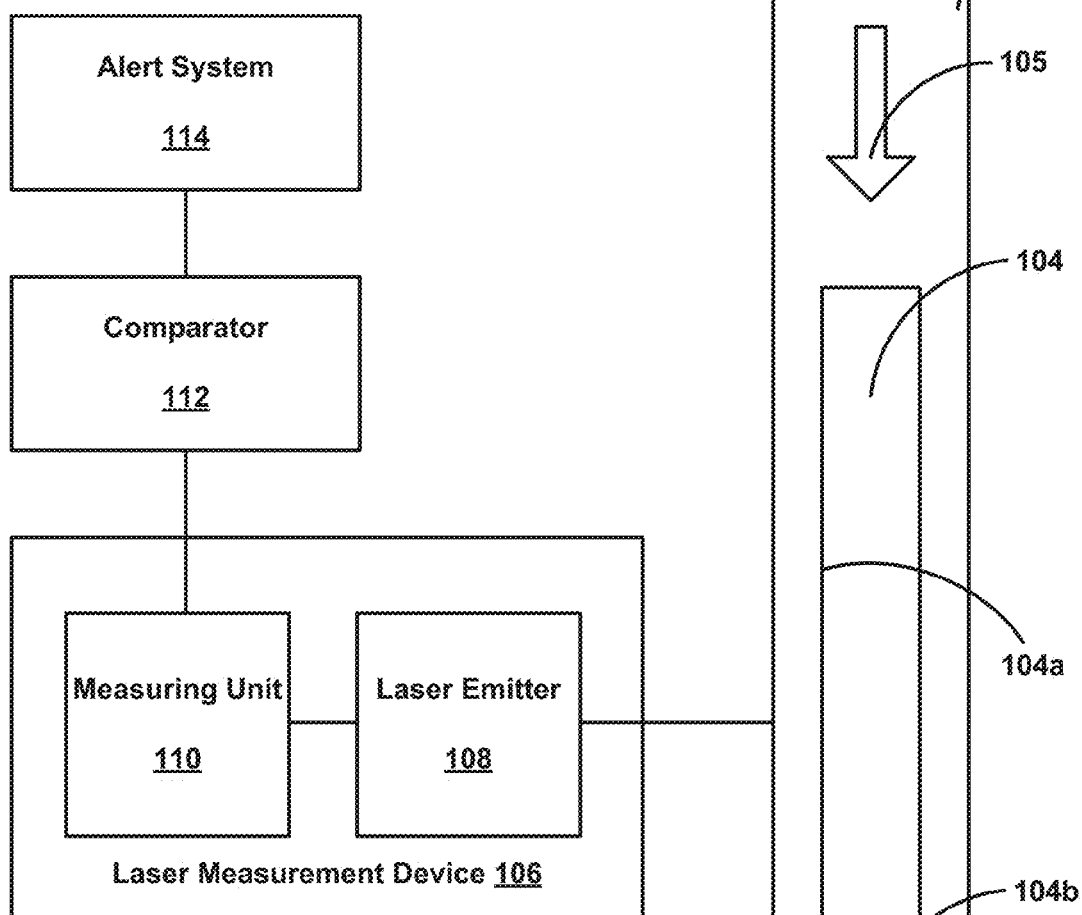
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to a real-time system for measuring profiles of manufactured articles, such as laminate and hardwood flooring, in real time. A laser measuring device can be installed (e.g., fixedly mounted) in a production line, and can capture multiple critical dimensions of a profile of an article as the article passes over the installed laser measuring device. The measured dimensions can be stored in a memory in communication with the laser measuring device. In some aspects, a computer can compare the stored dimensions to one or more reference dimensions. In some aspects, a human-machine interface (e.g., a device producing audio and/or visual feedback) can provide an alert when a difference between one or more of the measured dimensions and the reference dimensions exceeds a predefined tolerance. Non-limiting examples of reference dimensions include a length of a groove, a height of a groove, a thickness of a tongue or projection of the article, a vertical clearance of a tongue or other projection relative to a bottom surface of the article, a height of a lower surface of a groove relative to a bottom surface of the article, a height of an upper surface of a groove relative to a bottom surface of the article, a length between a starting location of a groove and an outer end surface of the article (representing the length of the recess between the end of the article and the start of the groove). More generally, it is contemplated that the reference dimensions disclosed herein can refer to a linear distance between any two selected reference points along the surfaces of the profile of the article, including a height (relative to a vertical axis), a length, or a width/depth of one profile feature relative to an outer edge surface or other profile feature of the article.

FIG. 1 shows a schematic diagram of a quality control device 100. The quality control device 100 can comprise a conveyor device 102. In some aspects, the conveyor device 102 can comprise a flat belt conveyor, a cleated belt conveyor, a roller conveyor, motorized rollers, and/or combinations thereof. The conveyor device 102 can be configured to convey one or more articles 104 to a laser measurement device 106. In some aspects, the conveyor can move at a speed comparable to conventional conveyor systems. For example, the conveyor can operate at a speed of approximately 600 feet per minute, approximately 750 feet per minute, approximately 1000 feet per minute, and the like. Additional speed decreases or increases are contemplated.

Figure 2:
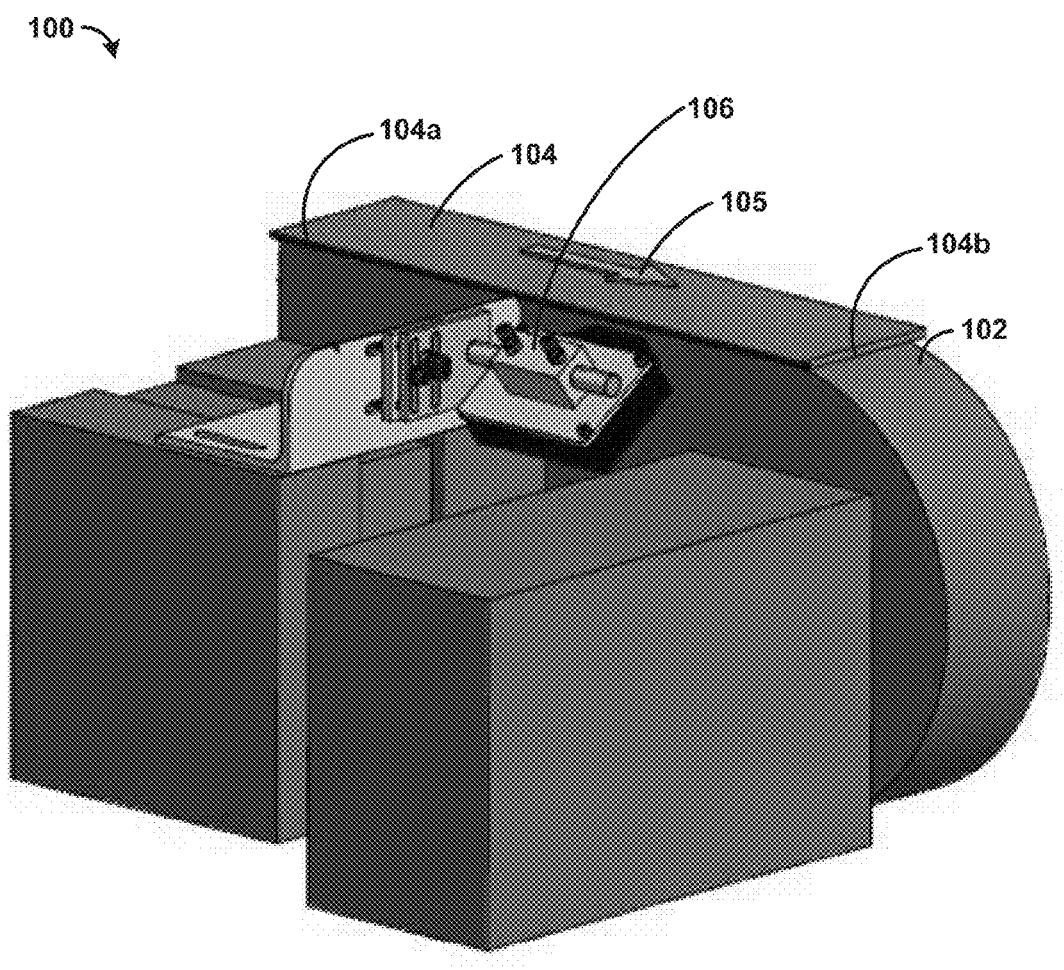
FIG. 2 illustrates various aspects of an exemplary system.

As shown in FIG. 2, the one or more articles 104 conveyed by the conveyor device 102 can comprise, for example, flooring boards, such as laminate flooring, hardwood flooring and/or the like. In exemplary non-limiting aspects, the flooring products can comprise tongue-and-groove features positioned on opposing ends (e.g., leading and trailing ends or opposing first and second sides) of a flooring board. Optionally, it is contemplated that the tongue-and-groove features can comprise non-interference tongue-and-groove features as are known in the art. Optionally, it is further contemplated that the tongue-and-groove features can be configured to provide a slip-fit between adjacent flooring articles.

When the faces of the flooring boards and other articles are analyzed as further disclosed herein, it is contemplated that the disclosed system can analyze and/or measure various points and dimensions of the end or edge profile features (e.g., engagement or locking features) of the flooring boards (e.g., tongue-and-groove type features including tongues, projections, grooves, and the like) to evaluate compatibility between the end/edge features of the flooring board and a standard (desired) engagement profile associated with a particular flooring product. It is further contemplated that such an analysis and/or measurement can permit identification of defective products and, optionally, permit modification of the defective product to provide compatibility with other flooring products having the correct end/edge profile.

In some aspects, the one or more articles 104 can be disposed such that each article has a particular orientation relative to the direction of travel (direction of conveyance) 105 along the conveyor device 102. For example, the one or more articles 104 can define a plurality of faces. The plurality of faces can comprise at least one face 104a (such as, for example and without limitation, a side face as shown in FIG. 1) that is oriented parallel or substantially in parallel with the direction of travel along the conveyor device, and at least one face 104b (such as, for example and without limitation, a front or leading face or a rear or trailing face) that is oriented perpendicular or substantially perpendicular with respect to the direction of travel. As used herein, the terms "substantially in parallel" or "generally parallel" can include surfaces that are within 20 degrees of parallel and, more preferably, within 15 degrees of parallel. Similarly, the term "substantially perpendicular" or "generally perpendicular" can include surfaces that are within 20 degrees of being perpendicular and, more preferably, within 15 degrees of perpendicular.

In an aspect, the one or more articles 104 can be disposed at fixed positions relative to the conveyor device 102. Optionally, it is contemplated that various fixation devices (e.g., clamps, guide surfaces, and the like) as are known in the art can be used to dispose the one or more articles 104 in their fixed positions.

Returning to FIG. 1, a laser measurement device 106 can comprise a laser emitter 108 configured to emit one or more laser light beams, wherein at least one (e.g., each) of the one or more laser light beams can be configured to irradiate at least a portion of the faces 104a, 104b of the one or more articles 104. Optionally, it is contemplated that the one or more laser light beams can be configured to irradiate at least a portion of at least three faces of the one or more articles. For example, it is contemplated that the one or more laser light beams can be configured to irradiate a front or leading face, a rear or trailing face, and at least one side face extending between the front/leading and rear/trailing faces. The laser measuring device 106 can further comprise a measurement unit 110 configured to analyze and/or measure, based on the irradiation of the article 104 from the laser emitter 108, one or more profile dimensions associated with the first face of the article 104a and one or more profile dimensions associated with the second face of the article 104b. It is further contemplated that profile dimensions associated with additional faces of the article can also be analyzed and/or measured. As further disclosed herein, it is contemplated that the profile dimensions disclosed herein can correspond to particular locations on a face of the article, and the analysis and/or measurement of the profile dimensions can include a determination of a distance between a selected profile point and a known reference point, as well as a comparison between the measured distance and an expected distance that falls within a desired threshold/tolerance.

In some aspects, the laser measurement device 106 can be adjustably mounted to a fixed location axial location relative to the conveyor device 102. As an example, one or more of a height, an angle, and a depth relative to the conveyor device can be adjusted. For example, the laser measuring device 106 can be positioned using one or more adjustable set screws to semi-permanently fix a location and/or orientation of the laser measuring device 106 relative to the conveyor device 102.

In an aspect, the laser measurement device 106 can comprise a laser scanner. The laser scanner can emit radiation or light (e.g., laser light or a laser beam) and detect its reflection in order to scan an object.

In aspects, laser scanners can operate using, for example, a time-of-flight principle or a triangulation principle. A time-of-flight scanner can comprise an active scanner that uses laser light to probe the article 104. At the heart of this type of scanner is a time-of-flight laser range finder. The laser range finder finds the distance to a surface by timing the round-trip time of a pulse of light. The laser emitter 108 can be used to emit a pulse of light and the amount of time before the reflected light is seen by a detector is measured. Since the speed of light is known, the round-trip time can be used to determine the travel distance of the laser light, which is twice the distance between the scanner and the surface. That is, a distance between the laser emitter 108 and the article 104 is equal to the speed of light multiplied by the round-trip time, divided by two. Accuracy of a time-of-flight laser scanner can depend, at least in part, on how precisely the round trip time can be measured. For example, it takes approximately 3.3 picoseconds for light to travel 1 millimeter. Accordingly, timing on the order of picoseconds is necessary for millimeter-level accuracy using a time-of-flight scanner. Moreover, a time of flight scanner can detect a distance between the laser emitter 108 and one point in its direction of view. Thus, the time-of-flight scanner can scan its entire field of view one point at a time by changing the scanner direction of view to scan different points. The direction of view of the time-of-flight scanner can be changed by, for example, rotating the scanner itself or using a system of rotating mirrors. Use of the system of rotating mirrors is more commonly used because mirrors are much lighter and can thus be rotated faster and with greater accuracy. In some aspects, a conventional time-of-flight 3D laser scanner can measure distances from about 10,000 to about 100,000 points per second.

In some aspects, the laser measuring device 106 can operate based on a triangulation method. A triangulation-based laser measuring device 106 can comprise a laser emitter 108 that uses laser light to irradiate and scan an object. In some aspects, the laser emitter can irradiate the face 104a of the article 104 at a first angle relative to the face 104a (measured within a plane containing a vertical axis and the laser light emitted by the laser emitter). In some aspects, the first angle can be determined at least partially based on a profile of the object. The first angle can measure between 0° and 179°. In some aspects, the first angle can be oblique. The laser emitter can also be configured to irradiate the face 104b of the article 104 at a second angle relative to the face 104b. It is understood that the light emission profile can be selectively adjustable as required to measure any selected profile dimension as further disclosed herein. For example, it is contemplated that the position and angular orientation of the laser emitter can be selectively adjusted relative to at least one axis, at least two axes, or at least three axes (e.g., a vertical axis, an axis parallel to the direction of movement, and a transverse axis perpendicular to both the vertical axis and the direction of movement). Optionally, the first angle and the second angle can range from about 35 degrees to about 135 degrees or be about 90 degrees; however, it is understood that any desired angle ranging from 0 degrees to about 179 degrees can be used.

In some aspects, the first angle and the second angle can be the same. In other aspects, the first angle can be different from the second angle. The emitter 108 of the triangulation laser scanner can irradiate an object using a triangulation laser, and can use a sensor (e.g., a light sensor, a charge-coupled device (CCD), a camera, etc.) to determine a distance to the object based on reflection of at least a portion of the laser light. Accordingly, the measurement unit 110 of the triangulation laser scanner can comprise the sensor. The measurement unit 110 can determine a distance between the article 104 and the laser emitter 108 based on a location of the laser dot in a field of view of the sensor. This technique is called triangulation because the position at which the laser strikes the article, the sensor and the laser emitter form a triangle. A length of one side of the triangle, the distance between the sensor and the laser emitter is known. An angle of the laser emitter corner (e.g., an angle formed between a line connecting the laser emitter and the sensor and a line connecting the laser emitter and the article) is also known. Accordingly, an angle of the sensor corner (e.g., an angle formed between a line connecting the laser emitter and the sensor and a line connecting the sensor and the article) can be determined based on the location of the laser dot on the sensor. These three pieces of information fully determine the shape and size of the triangle, and provide a basis for determining a location at which the laser light strikes the article. In some aspects, a laser stripe can be used to irradiate the object instead of a single laser dot. Typically, triangulation based scanners are useful for shorter distances, when compared to time-of flight scanners, but also provide increased measurement accuracy when compares to the time-of-flight scanners. For example, a triangulation-based scanner may be used for measuring distances of approximately 2 mm to approximately 1 meter. Optionally, in some aspects, accuracy within such a range can be within 0.05 mm, within 0.02 mm, or within 0.02 µm.

Triangulation-based measuring devices can also make a comparable number of measurements in a given amount of time, when compared to time-of-flight measurement devices. As an example, a triangulation-based measurement device can be capable of a measuring rate of about 49 kHz (e.g., approximately 49,000 measurements per second).

In other aspects, the laser measurement device 106 can comprise a conoscopic system. In the conoscopic system, the laser emitter 108 can project a laser beam onto a surface and of an object. A reflection along the same ray-path can be put through a conoscopic crystal and projected onto the measurement unit 110, which can comprise a sensor (e.g., a CCD). The result of the projection is a diffraction pattern that can be frequency analyzed to determine a distance to the measured surface of the article 104. Conoscopic measurement systems can use a single ray-path for measuring, thus providing an opportunity to measure, for instance, a depth of a finely drilled hole.

The quality control device 100 can further be configured to comprise a comparator 112. The comparator 112 can store one or more pre-defined reference points or dimensions indicating an intended position of an article. The comparator 112 can be configured to determine a difference between the measured one or more profile points or dimensions associated with the first face of the article and one or more profile points or dimensions associated with the second face of the article and a plurality of corresponding predefined reference points or dimensions. In an aspect, the comparator can be configured to perform one or more trigonometric functions based on the first angle and/or the second angle to compare the measured one or more profile points or dimensions associated with the first face and the measured one or more profile points or dimensions associated with the second face with the plurality of predefined reference points or dimensions. In some aspects, the trigonometric functions used to compare the measured one or more profile points or dimensions associated with the first face and the measured one or more profile points or dimensions associated with the second face with the plurality of predefined reference points or dimensions can be based at least in part on a profile of the article. In some aspects, the comparisons can be calculated in real time. In some aspects, the comparator can further compare the determined difference with a pre-defined tolerance threshold to determine if the measured article is within a tolerance of an ideal article shape. Exemplary trigonometric functions that can be used to determine profile dimensions as disclosed herein include sine, cosine, tangent, cotangent, secant, and cosecant. In use, it is contemplated that these trigonometric functions can be used in conjunction with known dimensions to determine a counterpart value for an unknown profile dimension as further disclosed herein.

Figure 5:
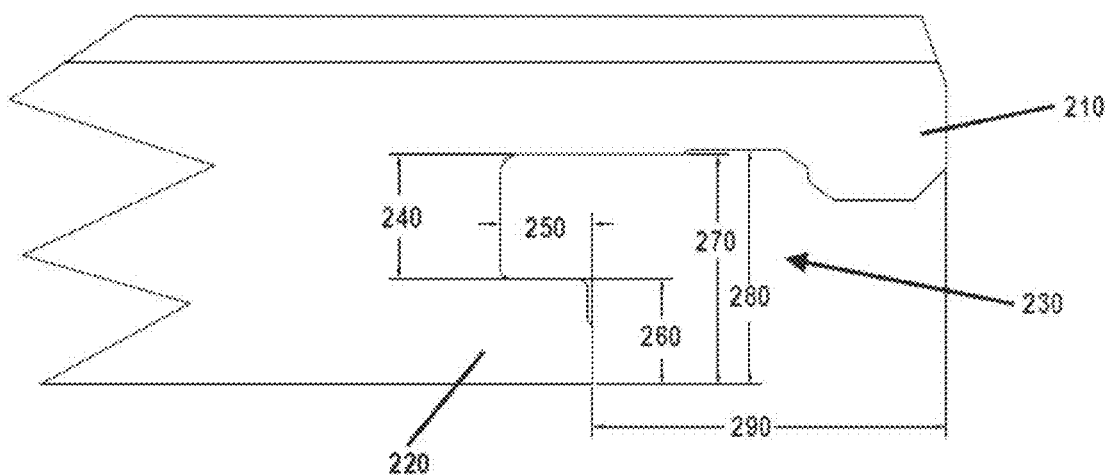
FIG. 5 is a side view of an exemplary end portion of a flooring article, with various profile dimensions labeled.

As an example, FIG. 5 depicts an exemplary "groove" end of a flooring article having opposing tongue-and-groove features. With reference to FIG. 5, the "groove" end of the flooring article can include an upper projection 210, a lower leg 220, and a groove 230 that extends below the upper projection and between the upper projection and the lower leg. As shown, it is contemplated that the lower leg 220 can be recessed relative to an end surface of the flooring article, which can be defined by the upper projection 210. As shown in FIG. 5, exemplary non-limiting profile dimensions of the depicted flooring article that can be measured by the disclosed system can include one or more of the following: a height 240 of the portion of the groove 230 positioned between the upper projection 210 and the lower leg 220 (relative to a vertical axis); a length 250 of the portion of the groove 230 positioned between the upper projection 210 and the lower leg 220; a height 260 of the upper surface of the lower leg 220 (measured relative to a vertical axis extending from a bottom surface of the lower leg or the article); a height 270 of a first portion of the upper projection 210 that extends beyond the lower leg 220 (measured relative to a vertical axis extending from a bottom surface of the article); a height 280 of a second portion of the upper projection 210 that has a different height than the first portion of the upper projection (such as a portion that is recessed from the first portion of the upper projection as shown in FIG. 5); or a length 290 by which a leading/end surface of the lower leg 220 is recessed from the end surface of the flooring article (measured relative to an axis moving left-to-right and right-to-left across the page. These example dimensions are merely exemplary and it is contemplated that various other dimensions could be measured as disclosed herein. It is contemplated that similar measurements can be performed on an opposing "tongue" end of the depicted article to ensure desired fitting/engagement parameters between complementary flooring articles are maintained. It is further contemplated that any conventional article profile can be analyzed, evaluated, and/or modified as further disclosed herein. For example, it is contemplated that the disclosed systems and methods can be used with flooring articles having smooth end/edge faces, curved end/edge faces, angled end/edge faces, or end/edge faces having complex three-dimensional profiles.

The quality control device 100 can further comprise an alert system 114. The alert system can be in electrical communication with the comparator 112 and can compare the determined difference with a pre-defined tolerance threshold to determine if the measured article is within a tolerance of an ideal article shape. In an aspect, when the determined difference exceeds the tolerance threshold, the measured article can be determined to be defective. In some aspects, the alert system 114 can be further configured to alert a user in response to determining that the article is defective. For example, the alert system 114 can generate an audible alert and/or a visual alert. As a particular example, the comparator 112 can provide comparison information to the alert system 114, which can provide the comparison information to a visual display (e.g., a human machine interface (HMI)). An operator viewing the HMI can see which tool needs to be moved and how far (and in which direction(s)) the tool needs to be move on the HMI based upon the calculations performed by the comparator 112. In some aspects, the alert system 114 can be configured to notify a user electronically, such as by sending a short message system (SMS) message, an e-mail, and/or the like.

In some aspects, the quality control 100 can further comprise a plurality of cutting elements 116 configured to perform a plurality of cutting operations on the plurality of faces (e.g., faces 104a, 104b) of the article. In an aspect, the plurality of cutting elements 116 (e.g., knives, cutting blades, and the like) can be disposed along the path of the conveyor device 102, upstream of the laser measurement device 106. In some aspects, the plurality of cutting elements 116 can be mounted on one or more servos 118 (or other actuators) used to adjust a position of the cutting elements 116. In some aspects, the one or more servos 118 can be connected to the alert system 114, and can be configured to adjust the position of the cutting elements 116 in response to determining that the measured article is not within the tolerance threshold, such that the measured difference is less than the tolerance threshold. More particularly, after it is determined that an article is defective, the one or more servos (or other actuators) can control movement of the cutting elements to thereby effect cutting of selected portions of the faces of the article having measured features falling outside of predetermined tolerances/thresholds. It is contemplated that these cutting operations can be configured to modify the selected portions of the faces of the article to ensure compliance with the predetermined tolerances/thresholds. After cutting operations are performed, it is contemplated that the laser measurement device of the system can compare the modified profile of the faces of the article to the tolerances/thresholds to ensure compliance, and the modification process can be repeated as necessary until compliance is achieved.

FIG. 2 shows an example of a physical embodiment of the quality control device 100. The conveyor 102 conveys the article 104 to the laser measurement device 106. As discussed previously, the laser measurement device 106 comprises a laser emitter 108 configured to irradiate the article 104 (e.g., faces 104a and 104b) and a measurement unit 110 configured to measure one or more profile dimensions on the article 104.

Figure 3:
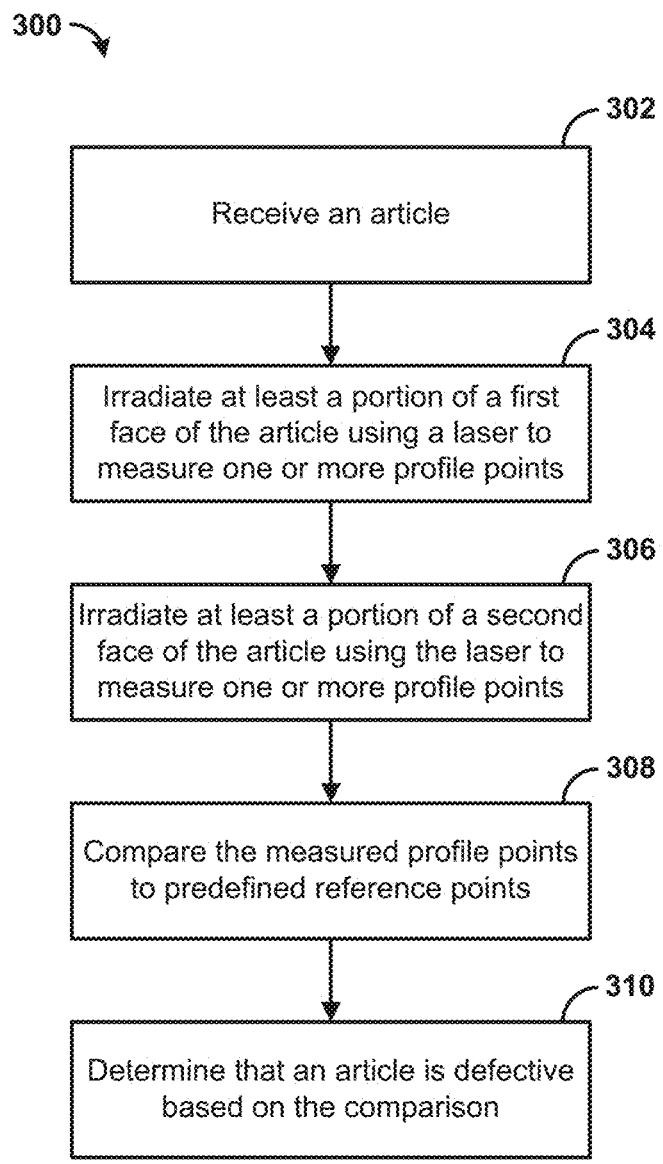
FIG. 3 is a flowchart illustrating an example method.

FIG. 3 shows an example method 300 of performing a real-time quality control process. At step 302, a laser measuring device can receive an article having a plurality of faces. In some aspects, the article can comprise a flooring article, such as a piece of laminate flooring, a piece of hardwood flooring, and/or the like. In an aspect, the article can be conveyed in a direction by a conveyor device. For example, the conveyor device can comprise a flat belt conveyor, a cleated belt conveyor, a roller conveyor, motorized rollers, and/or combinations thereof. The conveyor device can convey the article in a fixed direction to the laser measuring device.

At step 304, the laser measuring device can irradiate at least a portion of a first face of the article with a laser of the laser measuring device. The laser measuring device can further measure one or more profile dimensions associated with the first face of the article. In some aspects, the first face of the article can be disposed generally parallel with the direction of conveyance. In an aspect, irradiating at least the portion of the first face can be performed without adjusting a speed of conveyance of the article.

At step 306, the laser measuring device can irradiate at least a portion of a second face of the article with the laser. The laser measuring device can measure one or more profile dimensions associated with the second face of the article. In some aspects, the second face can be disposed generally perpendicular with the direction of conveyance. In an aspect, irradiating at least the portion of the second face can be performed without adjusting the speed of conveyance of the article.

In some aspects, the irradiating step 304 and the irradiating step 306 can be performed substantially contemporaneously. In other aspects, the irradiating step 304 and the irradiating step 306 can be performed sequentially. In still other aspects, it is contemplated that step 304 can be performed after the performance of step 306.

In aspects, the irradiating step 304 and the irradiating step 306 can be performed using, for example, a time-of-flight principle or a triangulation principle. A time-of-flight scanner can comprise an active scanner that uses laser light to probe an object (e.g., the article 104). At the heart of this type of scanner is a time-of-flight laser range finder. The laser range finder finds the distance to a surface by timing the round-trip time of a pulse of light. A laser emitter can be used to emit a pulse of light and the amount of time before the reflected light is seen by a detector is measured. Since the speed of light is known, the round-trip time can be used to determine the travel distance of the laser light, which is twice the distance between the scanner and the surface. That is, a distance between the laser emitter and the object is equal to the speed of light multiplied by the round-trip time, divided by two. Accuracy of a time-of-flight laser scanner can depend, at least in part, on how precisely the round trip time can be measured. For example, it takes approximately 3.3 picoseconds for light to travel 1 millimeter. Accordingly, timing on the order of picoseconds is necessary for millimeter-level accuracy using a time-of-flight scanner. Moreover, a time of flight scanner can detect a distance between the laser emitter and one point in its direction of view. Thus, the time-of-flight scanner can scan its entire field of view one point at a time by changing the scanner direction of view to scan different points and produce measurements of profile dimensions. The direction of view of the time-of-flight scanner can be changed by, for example, rotating the scanner itself or using a system of rotating mirrors. Use of the system of rotating mirrors is more commonly used because mirrors are much lighter and can thus be rotated faster and with greater accuracy. In some aspects, a conventional time-of-flight 3D laser scanner can measure distances to about 10,000 to about 100,000 points per second.

In some aspects, the irradiating step 304 and the irradiating step 306 can be performed based on a triangulation method. A triangulation-based laser measurement can comprise using a laser emitter to emit laser light to irradiate and scan one or more portions of an object. In some aspects, the laser emitter can irradiate the first face of the object at a first angle relative to the first face. The laser emitter can also be configured to irradiate the second face of the article at a second angle relative to the face. In some aspects, the first angle and the second angle can be the same. In other aspects, the first angle can be different from the second angle. The laser emitter of the triangulation laser scanner can irradiate an object using a triangulation laser, and can use a sensor (e.g., a camera, CCD, or other light sensor) to receive and measure a reflected portion of the laser, and can determine a distance between the article and the laser emitter based on a location of the reflected laser. This technique is called triangulation because the article, the sensor, and the laser emitter form a triangle. A length of one side of the triangle, the distance between the sensor and the laser emitter is known. An angle of the laser emitter corner (e.g., an angle formed between a line connecting the laser emitter and the sensor and a line connecting the laser emitter and the reflected laser) is also known. Accordingly, an angle of the sensor corner (e.g., an angle formed between a line connecting the laser emitter and the sensor and a line connecting the sensor and the article) can be determined based on the location of the laser dot on the sensor. These three pieces of information fully determine the shape and size of the triangle, and provide a basis for determining a location at which the laser strikes the article (for example, by using known trigonometric functions as disclosed herein). In some aspects, a laser stripe can be used to irradiate the object instead of a single laser dot. Typically, triangulation based scanners are useful for shorter distances, when compared to time-of flight scanners, but also provide increased measurement accuracy when compares to the time-of-flight scanners.

In other aspects, the irradiating step 304 and the irradiating step 306 can be performed using a conoscopic system. In the conoscopic system, a laser emitter can project a laser beam onto a surface and of an object. A reflection along the same ray-path can be put through a conoscopic crystal and projected onto a measurement unit, which can comprise a charge-coupled device. The result of the projection is a diffraction pattern that can be frequency analyzed to determine a distance to the measured surface of the article. Conoscopic measurement systems can use a single ray-path for measuring, thus providing an opportunity to measure, for instance, a depth of a finely drilled hole.

In step 308, a comparator can compare one the measured one or more profile dimensions associated with the first face and the one or more profile dimensions associated with the second face to predefined reference dimensions. In some aspects, the predefined reference dimensions can be stored in a memory in communication with the comparator. The predefined reference dimensions can be determined based on one or more mathematical equations.

In step 310, the comparator can determine, in response to a difference between the one or more measured profile dimensions associated with the first face and the one or more measured profile dimensions associated with the second face and the predefined reference dimensions exceeding a threshold value, that the article is defective.

In some aspects, the comparator can alert a user in response to determining that the article is defective. Alerting a user can comprise producing an audible alert, producing a visual alert, and/or sending an electronic message to a device associated with the user.

The method can optionally further comprise a step of outputting the differences determined by the comparator. For example, the differences can be output to a user through an HMI. In some aspects, at least a portion of the differences can be output electronically to a log file so that differences can be tracked over time. Moreover, the log file can be analyzed to identify any trends regarding the output differences.

In some aspects, the method can further comprise cutting at least one of the first face or the second face. For example, one or more cutting elements can be disposed upstream of the laser measuring device. The irradiating step 304 and the irradiating step 306 can be performed on the cut first face and the cut second face, respectively.

In some aspects, the one or more cutting elements can be mounted on one or more servos used to adjust a position of the cutting elements. In some aspects, the one or more servos can be connected to the alert system and can be configured to adjust the position of the cutting elements in response to determining that the measured article is not within the tolerance threshold, such that the measured difference is less than the tolerance threshold. In other aspects, one or more adjustments to the one or more cutting elements can be created (e.g., output to a user) based on the comparison of the one or more measured profile dimensions associated with the first face and the one or more measured profile dimensions associated with the second face and the predefined reference dimensions.

Figure 4:
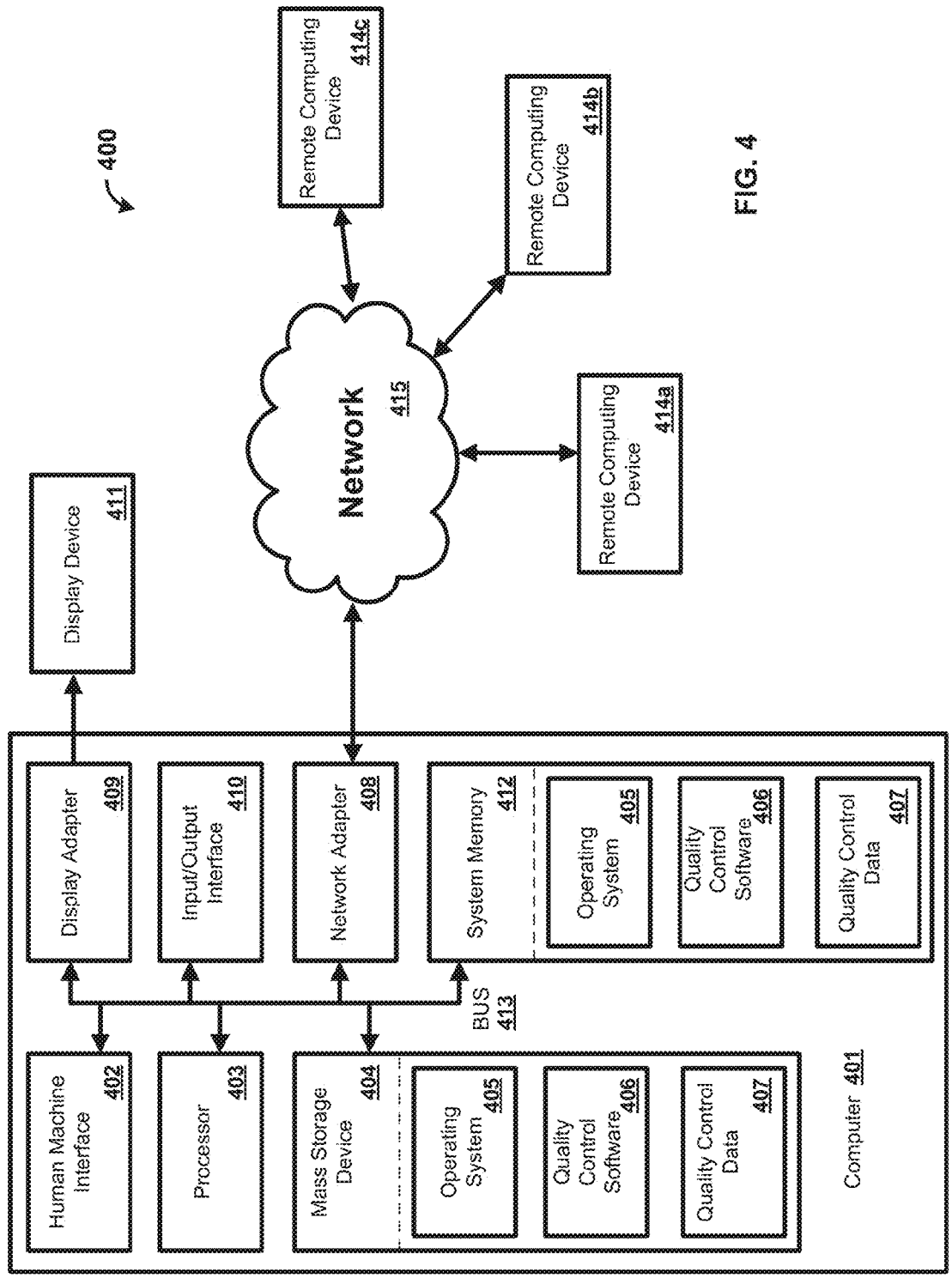
FIG. 4 is a block diagram illustrating an example computing device.

In an aspect, the methods and systems can be implemented on a computer 401 as illustrated in FIG. 4 and described below. Similarly, the methods and systems disclosed can utilize one or more computers to perform one or more functions in one or more locations. FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 401. The components of the computer 401 can comprise, but are not limited to, one or more processors 403, a system memory 412, and a system bus 413 that couples various system components including the one or more processors 403 to the system memory 412. The system can utilize parallel computing.

The system bus 413 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 413, and all buses specified in this description can also be implemented over a wired or wireless network connection and each of the subsystems, including the one or more processors 403, a mass storage device 404, an operating system 405, quality control software 406, quality control data 407, a network adapter 408, the system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as the quality control data 407 and/or program modules such as the operating system 405 and the quality control software 406 that are immediately accessible to and/or are presently operated on by the one or more processors 403.

In another aspect, the computer 401 can also comprise other removable/non-removable, volatile/non-volatile computer storage media. By way of example, FIG. 4 illustrates the mass storage device 404 which can provide non-volatile storage of computer code, computer readable instructions, data structures, program modules, and other data for the computer 401. For example and not meant to be limiting, the mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, the operating system 405 and the quality control software 406. Each of the operating system 405 and the quality control software 406 (or some combination thereof) can comprise elements of the programming and the quality control software 406. The quality control data 407 can also be stored on the mass storage device 404. The quality control data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 403 via the human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, the display device 411 can also be connected to the system bus 413 via an interface, such as the display adapter 409. It is contemplated that the computer 401 can have more than one display adapter 409 and the computer 401 can have more than one display device 411. For example, the display device 411 can be a monitor, an LCD (Liquid Crystal Display), or a projector. In addition to the display device 411, other output peripheral devices can comprise components such as speakers (not shown) and a printer (not shown) which can be connected to the computer 401 via the Input/Output Interface 410. Any step and/or result of the methods can be output in any form to an output device. Such output can be any form of visual representation, including, but not limited to, textual, graphical, animation, audio, tactile, and the like. The display device 411 and computer 401 can be part of one device, or separate devices.

The computer 401 can operate in a networked environment using logical connections to one or more remote computing devices 414*a,b,c*. By way of example, a remote computing device can be a personal computer, portable computer, smartphone, a server, a router, a network computer, a peer device or other common network node, and so on. Logical connections between the computer 401 and a remote computing device 414*a,b,c* can be made via a network 415, such as a local area network (LAN) and/or a general wide area network (WAN). Such network connections can be through the network adapter 408. The network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the one or more processors 2403 of the computer. An implementation of the quality control software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, at a laser measuring device, a flooring article having a plurality of faces, the article being conveyed in a direction;
   irradiating at least a portion of a first face of the plurality of faces of the article with a laser of the laser measuring device to measure one or more profile dimensions associated with the first face of the article, wherein the first face is disposed generally parallel with the direction of conveyance;
   irradiating at least a portion of a second face of the plurality of faces of the article with the laser to measure one or more profile dimensions associated with the second face of the article, wherein the second face is disposed generally perpendicular to the direction of conveyance;
   comparing the measured one or more profile dimensions associated with the first face and the one or more profile dimensions associated with the second face to predefined reference dimensions; and
   determining, in response to a difference between measured one or more profile dimensions associated with the first face and the one or more profile dimensions associated with the second face and the predefined reference dimensions exceeding a threshold value, that the article is defective.

2. The method of claim 1, further comprising: alerting a user in response to determining that the article is defective.

3. The method of claim 2, wherein alerting a user comprises one or more of producing an audible alert, producing a visual alert, and sending an electronic message to a device associated with the user.

4. The method of claim 1, further comprising cutting at least the first face and the second face, wherein the irradiating at least the portion of the first face comprises irradiating at least a portion of the cut first face and wherein the irradiating at least the portion of the second face comprises irradiating at least a portion of the cut second face.

5. The method of claim 4, wherein further comprising adjusting one or more cutting devices based on the comparison.

6. The method of claim 4, further comprising, creating a list of one or more adjustments to be made to one or more cutting devices based on the comparison.

7. The method of claim 1, wherein the irradiating the at least the portion of the first face comprises irradiating the face at a first angle relative to the first face, and wherein the irradiating the at least the portion of the second face comprises irradiating the face at a second angle relative to the second face.

8. A device comprising:
a conveyor configured to convey an article having a plurality of faces in a direction;
a laser configured to irradiate at least a portion of a first face of the plurality of faces of the article disposed generally parallel with the direction of conveyance and to irradiate at least a portion of a second face of the plurality of faces of the article disposed generally perpendicular to the direction of conveyance;
a measuring device configured to measure one or more profile dimensions associated with the first face of the article and one or more profile dimensions associated with the second face of the article based on the laser irradiation;
a comparator configured to determine a difference between the measured one or more profile dimensions associated with the first face of the article and one or more profile dimensions associated with the second face of the article and a plurality of corresponding predefined reference dimensions; and
an alert system configured to determine that the article is defective in response to the difference exceeding a threshold value.

9. The device of claim 8, wherein the alert system is further configured to alert a user in response to determining that the article is defective.

10. The device of claim 9, wherein alerting a user comprises one or more of producing an audible alert, producing a visual alert, and sending an electronic message to a device associated with the user.

11. The device of claim 8, wherein the laser is configured to irradiate the first face at a first angle relative to the first face.

12. The device of claim 11, wherein the laser is configured to irradiate the second face at a second angle relative to the second face.

13. The device of claim 11, wherein the comparator is configured to perform one or more trigonometric functions based on the first angle to compare the measured one or more profile dimensions associated with the first face with the plurality of predefined reference dimensions.

14. A device comprising:
a conveyor configured to convey an article having a plurality of faces in a direction;
a plurality of cutting elements configured to perform a plurality of cutting operations on the plurality of faces of the article;
a laser configured to irradiate at least a portion of a first cut face of the plurality of faces of the article disposed generally parallel with the direction of conveyance and to irradiate at least a portion of a second cut face of the plurality of faces of the article disposed generally perpendicular to the direction of conveyance;
a measuring device configured to measure one or more profile dimensions of the first cut face and one or more profile dimensions of the second cut face based on the laser irradiation;
a comparator configured to determine a difference between the measured one or more profile dimensions of the first cut face and one or more profile dimensions of the second cut face and a plurality of corresponding predefined reference dimensions; and
an alert system configured to determine that the article is defective in response to the difference exceeding a threshold value.

15. The device of claim 14, wherein the alert system is further configured to alert a user in response to determining that the article is defective.

16. The device of claim 15, wherein alerting a user comprises one or more of producing an audible alert, producing a visual alert, and sending an electronic message to a device associated with the user.

17. The device of claim 15, wherein the alert system is further configured to produce a list of adjustments to the cutting elements needed to reduce the difference to less than the threshold value.

18. The device of claim 15, further comprising one or more actuators used to adjust the cutting elements to reduce the difference to less than the threshold value.

19. The device of claim 14, wherein the laser is configured to irradiate the first cut face at an angle relative to the first cut face.

20. The device of claim 19, wherein the comparator is configured to perform one or more trigonometric functions based on the angle to compare the measured one or more profile dimensions associated with the first cut face with the plurality of predefined reference dimensions.

* * * * *